United States Patent [19]

Fujimoto

[11] 4,071,232
[45] Jan. 31, 1978

[54] SHEET DETECTOR IN SHEET FEED STATION

[75] Inventor: Sakae Fujimoto, Chofu, Japan

[73] Assignee: Ricoh Company, Ltd., Japan

[21] Appl. No.: 727,251

[22] Filed: Sept. 27, 1976

[30] Foreign Application Priority Data

Sept. 29, 1975  Japan .................. 50-117497

[51] Int. Cl.$^2$ .................. B65H 1/04; B65H 7/04
[52] U.S. Cl. .................. 271/8 R; 271/9; 271/164; 271/265; 358/256; 358/286
[58] Field of Search .................. 271/9, 162, 164, 145, 271/258, 259, 265, 8 R; 358/286, 256

[56] References Cited

U.S. PATENT DOCUMENTS

3,907,283    9/1975    Miller .................. 271/164 X

*Primary Examiner*—Bruce H. Stoner, Jr.
*Attorney, Agent, or Firm*—McGlew and Tuttle

[57] ABSTRACT

A sheet detector for use in an equipment such as a facsimile system which uses two kinds of sheets for recording of a received signal and for transmission of an original. The presence of absence of an "original" sheet is detected by a detecting member which is disposed directly above a cassette containing record sheets for reception and which is located in the sheet feed station. The detecting member is disposed so as to traverse across the sheet cassette, and is mounted in the sheet feed station so that it rocks in a downward direction under the gravity of the "original" sheet when the latter is placed on the detecting member.

8 Claims, 2 Drawing Figures

U.S. Patent   Jan. 31, 1978   4,071,232
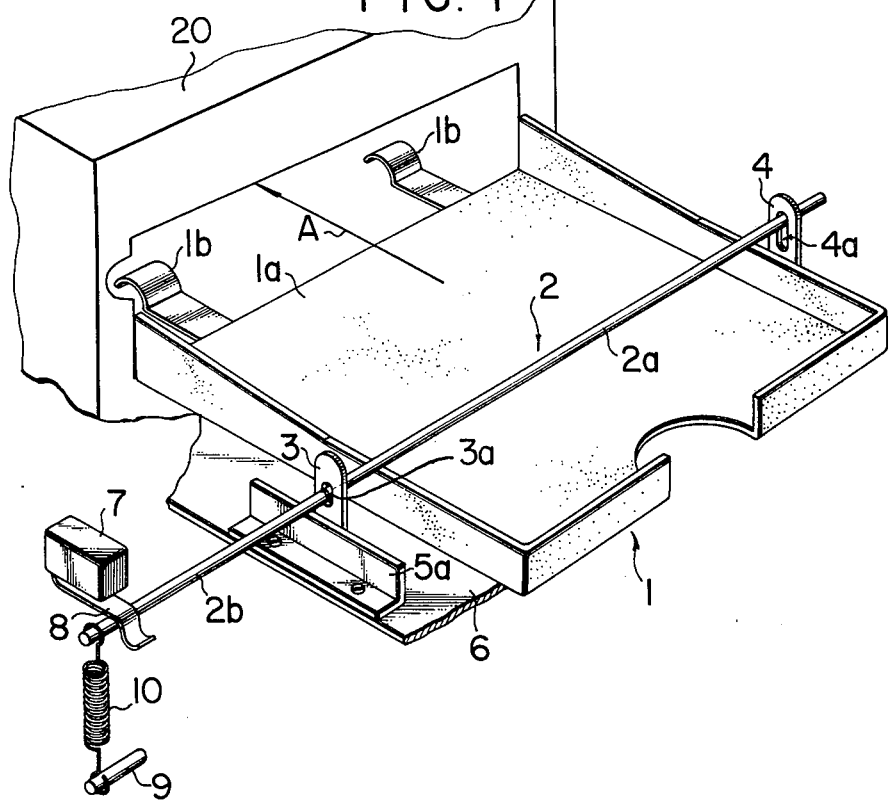
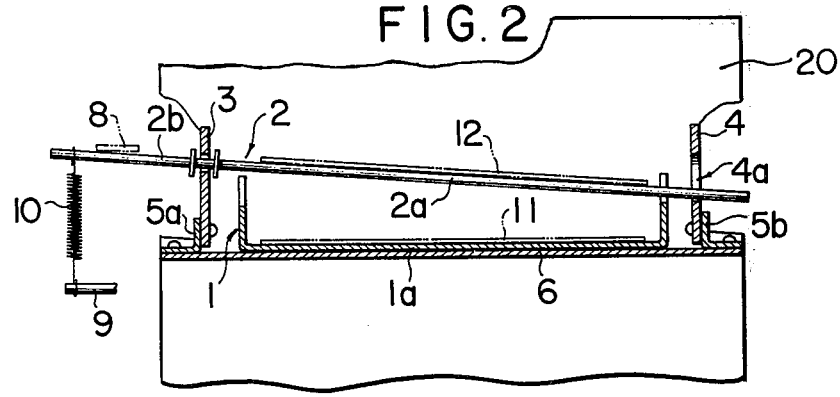

SHEET DETECTOR IN SHEET FEED STATION

BACKGROUND OF THE INVENTION

The invention relates to a sheet detector for use in a sheet feed station of an equipment such as a facsimile system, and more particularly, to an apparatus which detects the presence or absence in the feed station of an "original" sheet for transmission which is used in a facsimile transceiver system or the like.

In an equipment utilizing a first and a second sheet, such as a record sheet for reception and an "original" sheet for transmission in a facsimile transceiver system, or a copy sheet and an "original" sheet (or a master plate in a printing machine) in a copying machine and an offset printing machine, it is necessary to change the function of the equipment depending on whether the first or the second sheet is being fed. Taking a facsimile transceiver, for example, when the first sheet or the record sheet for reception is being fed into an information recording section of the transceiver, the latter must be set in a receive mode while when the second sheet or an "original" sheet for transmission is fed into the transmitting section of the transceiver, the latter must be set in a transmit mode.

A switching of the equipment so that it is capable of functioning in a manner corresponding to the first or the second sheet being used is usually achieved by a manual operation by an operator as either sheet is used. In one example, there are provided a pair of cassettes which receive the first and the second sheet, respectively, and a procedure to set either the first or the second cassette in position on the sheet feed station is utilized to switch the function of the equipment. Alternatively, the equipment is normally maintained in a condition in which it has the function corresponding to the first cassette, but is switched to another function by a procedure of setting the second cassette in position. The first and second cassettes are disposed one above another in the sheet feed station of the equipment and are selectively brought into facing relationship with a sheet feed member, for example, a sheet feed roller, of the station by a manual operation of an operator. While the function of the equipment may be conveniently switched in dependence upon the intended cassette to be used, there is a disadvantage that the equipment is switched to the function corresponding to the second sheet whenever the second cassette is set in position, irrespective of whether the second cassette actually contains in available sheet therein.

SUMMARY OF THE INVENTION

In accordance with the invention, a "second sheet" detecting member is disposed immediately above a first sheet containing cassette placed in a sheet feed station so as to extend in a horizontal direction across the cassette. Intermediate its length, the detecting member is rockably mounted on one side of the cassette so as to be movable in the vertical direction above the cassette, and is normally biased to move away from the cassette. When a second sheet is placed on the detecting member, its gravity causes a rocking motion of the detecting member, thereby allowing the detection of the presence of the second sheet in its sheet feed position.

Therefore, it is an object of the invention to provide a sheet detector capable of detecting whether a second sheet to be used is actually placed in the sheet feed position.

It is another object of the invention to provide a sheet detector which is extremely simple in construction.

It is a further object of the invention to provide a sheet detector having associated therewith a signal source for generating a signal to switch a facsimile transceiver to a receive or a transmit mode depending on whether or not a second sheet is placed in its sheet feed station.

BRIEF DESCRIPTION OF THE DRAWINGS

FIG. 1 is a perspective view of a sheet detector constructed in accordance with one embodiment of the invention; and FIG. 2 is a vertical section of the sheet detector through a vertical plane which includes a sheet detecting member in the form of a wire which extends in a horizontal direction above a sheet cassette.

DESCRIPTION OF PREFERRED EMBODIMENT

Referring to the drawings, there is shown a cassette 1 which contains a plurality of first sheets. The cassette includes a baseplate 1a, from the front end of which project a pair of detent 1b to be fitted into suitable openings formed in the body of the equipment, or machine 20 thus enabling the apparatus to be detachably mounted on the equipment. A sheet detecting member 2 in the form of thin rod extends immediately above the cassette 1 in a direction perpendicular to the sheet feed direction which is indicated by an arrow A. A pair of support plates 3, 4 each having a hole 3a and an elongate slot, 4a formed therein respectively are secured to a pair of L-shaped holders 5a, 5b (see FIG. 2) which are in turn secured to the base 6 of the equipment 20 by means of set screws. The detecting member 2 is passed through the hole 3a and slot 4a and is rockably relative to the baseplate 1a in the vertical direction. One end 2a of the detecting member 2 is shown extending through the slot 4a. As indicated in FIG. 2, a pair of collars (not designated) are fixedly mounted on the detecting member on the opposite sides of the support plate 3, thus preventing an axial movement of the detecting member.

The other end 2b of the sheet detecting member 2 is adapted to be engaged by an actuator 8 of a microswitch 7, for example. This end of the detecting member 2 has anchored thereto one end of a tension spring 10 of a relatively small resilience, the other end of the spring 10 being secured to a stationary pin 9. In this manner, the detecting member is urged to rotate about the edge of the hole 3a in a direction such that the end 2a thereof moves away from the baseplate 1a of the cassette 1. A further movement of the detecting member in this direction is prevented by the abutment of the end 2a against the upper edge of the guide 4a formed in the support plate 4. It is to be understood that the bias applied to the detecting member 2 by the spring 10 is less than the influence upon the detecting member 2 of the gravity of a single second sheet which is placed thereon. It will be appreciated that the spring may be replaced by a weight.

In operation, a first sheet, for example, a record sheet 11 which may be used in the reception of a facsimile system, is placed on the baseplate 1 of the cassette 1, as shown in FIG. 2. Usually, a fascimile transceiver is conditioned such that it is in a receive mode when the main switch is turned on. When the record sheet 11 is placed in the manner mentioned above, it is fed in the direction of the arrow A for recording a received signal. When a second sheet, for example, an "original"

sheet 12 for transmission, is placed on top of the detecting member 2, the gravity of the sheet 12 causes the detecting member 2 to rotate clockwise, as viewed in FIG. 2, about the edge of the slot 3a while overcoming the resilience of the spring 10. This results in an upward movement of the actuator 8 to operate the microswitch 7. In response thereto, the receive mode which is normally established is switched to a transmit mode. Subsequently, the "original" sheet 12 is fed in the direction of the arrow A as shown in FIG. 1 for performing a required transmit operation. Where a plurality of "original" sheets 12 are placed in a stack, they are fed sheet by sheet, and when a feeding operation of the last original is completed, the detecting member 2 rotates counterclockwise, as viewed in FIG. 2, under the resilience of the spring 10, thus returning to the position shown in FIG. 1. It will be noted that the microswitch 7 mentioned above may be replaced by a photosensor or the sheet detecting member may be provided with a permanent magnet which operates a read switch.

While in the embodiment described above, the support plates 3, 4 and holders 5a, 5b have been mounted on the part of the body of the equipment, they may be formed on the cassette 1 itself in order to facilitate the accommodation of sheets in the cassette 1.

What is claimed is:

1. A sheet holding and detecting device adapted for use on a machine operating on sheet material for detecting the presence or absence of a sheet to be fed to a machine comprising a sheet supply means adapted to be mounted adjacent the sheet feeding end of such machine, said supply means being adapted to contain a supply of first sheets, a detecting means for supporting and detecting the presence or absence of a second sheet, means for mounting said detecting means relative to said sheet supply means so as to extend transversely of said supply means for movement between a second sheet presence position and a second sheet absence position, means for biasing said detecting means toward a second sheet absence position whereby the force exerted by said biasing means is equal to less than the gravity influence of one of said second sheets supported on said detecting means, means for limiting the movement of said detecting means when subjected to the bias of said biasing means, and switch means disposed so as to be responsive to the movement of said detecting means to produce a signal when said detecting means is subjected to the weight of a second sheet so as to indicate the presence of a second sheet on said detecting means.

2. The invention as defined in claim 1 wherein said detecting means comprises a rod extending transversely and above said sheet supply means.

3. The invention as defined in claim 2 wherein said sheet supply means comprises a cassette for containing a supply of said first sheets, and said rod extends transversely of said cassette.

4. The invention as defined in claim 7 wherein said mounting means for said detector includes opposed holders, said holders having opposed openings therein through which said detecting rod extends transversely and above said supply of first sheets, one of said openings defined as an elongated slot to provide for limited movement of the end of the rod extended therethrough, and said biasing means operating on the other end of the said rod.

5. The invention as defined in claim 4 wherein said biasing means comprises a spring.

6. The invention as defined in claim 1 including a support base for supporting said supply means adapted to be mounted at the feed end of such machine, said sheet supply means being detachably connected to said support base, and said detecting means being mounted on said base.

7. The invention as defined in claim 1 in which said switch means generates a signal for signalling the presence or absence of said second sheets.

8. A sheet holding and detecting device for use on a facsimile machine having a sheet feed station comprising a support base fixed to the feed station, a cassette adapted to contain a supply of first sheets detachably connected to said base, said cassette having an open end in the direction of feed, a pair of opposed holders mounted on said base so as to be disposed on opposite sides of said cassette, each of said holders having aligned openings formed therein, one of said openings being an elongated slot, a detecting means extended transversely of said cassette, said detecting means including a rod extended through said aligned openings whereby the end extended through said elongated slot can move between a sheet present position, and a sheet absence position, a biasing means operating on the other end of said rod, said biasing means including a spring, said detecting means being adapted for supporting a second sheet thereon, and said spring exerting a bias on said rod having a force which is less than the gravity influence exerted by a single second sheet, and a switch means responsive to the movement of said rod between a sheet present position and a sheet absence position whereby said switch means produces a signal when the detecting means is subjected to the weight of at least one second sheet supported thereon.

* * * * *